(12) United States Patent
Senoo (10) Patent No.: US 7,431,404 B2
(45) Date of Patent: Oct. 7, 2008

(54) BICYCLE HAVING ANNULAR SEALING MEMBER

(75) Inventor: Norihisa Senoo, Sakai Osaka (JP)

(73) Assignee: Shimano Inc., Osaka (JP)

( * ) Notice: Subject to any disclaimer, the term of this patent is extended or adjusted under 35 U.S.C. 154(b) by 176 days.

(21) Appl. No.: 11/197,531

(22) Filed: Aug. 5, 2005

(65) Prior Publication Data

US 2007/0029869 A1 Feb. 8, 2007

(51) Int. Cl.
*B60C 15/02* (2006.01)
*B60B 21/00* (2006.01)
(52) U.S. Cl. .................. 301/95.106; 301/58; 104/381.6
(58) Field of Classification Search .................... 301/55, 301/58, 95.104, 95.106, 104; 152/381.5, 152/381.6
See application file for complete search history.

(56) References Cited

U.S. PATENT DOCUMENTS

| 2,913,034 | A | | 11/1959 | Wall |
| 2,937,905 | A | * | 5/1960 | Altenburger ................. 301/58 |
| 3,008,770 | A | | 11/1961 | Mueller |
| 3,286,757 | A | | 11/1966 | Thomas |
| 3,335,776 | A | | 8/1967 | Blagden et al. |
| 4,108,232 | A | | 8/1978 | Simpson |
| 4,150,854 | A | | 4/1979 | Lohmeyer |
| 4,165,776 | A | | 8/1979 | Marvy |
| 4,289,186 | A | | 9/1981 | Wilde |
| 4,305,622 | A | | 12/1981 | Mitchell |
| 4,448,456 | A | | 5/1984 | Pfundstein |
| 4,824,177 | A | | 4/1989 | Aloy |
| 4,930,558 | A | | 6/1990 | Sahagian |
| 5,435,363 | A | | 7/1995 | Pender |
| 5,538,058 | A | | 7/1996 | Aloy |
| 5,988,764 | A | | 11/1999 | Deetz |
| 6,019,149 | A | | 2/2000 | Stringer |
| 6,119,746 | A | | 9/2000 | Lacombe et al. |
| 6,155,651 | A | | 12/2000 | Mizata et al. |
| 6,257,676 | B1 | | 7/2001 | Lacombe et al. |
| 6,318,428 | B1 | | 11/2001 | Lo |
| 6,428,115 | B1 | * | 8/2002 | Chen ..................... 301/95.106 |
| 6,443,533 | B2 | | 9/2002 | Lacombe et al. |
| 6,568,766 | B1 | * | 5/2003 | Okajima et al. ........ 301/95.104 |
| 6,641,227 | B2 | | 11/2003 | Lacombe et al. |
| 6,679,563 | B2 | | 1/2004 | Okajima |
| 6,736,462 | B1 | * | 5/2004 | Okajima ..................... 301/58 |
| 7,029,073 | B2 | * | 4/2006 | Chen .......................... 301/58 |
| 2004/0004391 | A1 | | 1/2004 | Fioravanti |
| 2004/0095014 | A1 | | 5/2004 | Veux et al. |

(Continued)

FOREIGN PATENT DOCUMENTS

CH 339518 6/1959

(Continued)

*Primary Examiner*—Russell D Stormer
(74) *Attorney, Agent, or Firm*—Global IP Counselors, LLP (57) ABSTRACT

A bicycle rim includes first and second annular side portions, an annular bridge portion and an annular seal member. The bridge portion extends between the first and second side portions. The bridge portion includes first and second annular tire support surfaces and a recessed center surface. The recessed center surface is arranged between the first and second tire support surfaces to form an annular recess. The recessed center surface has a plurality of circumferentially arranged openings formed therein. The annular seal member is arranged in the annular recess to seal the openings.

15 Claims, 7 Drawing Sheets

U.S. PATENT DOCUMENTS

| | | | | |
|---|---|---|---|---|
| 2005/0189813 | A1* | 9/2005 | Bauer | 301/95.104 |
| 2006/0108041 | A1* | 5/2006 | Schelhaas | 152/381.6 |

FOREIGN PATENT DOCUMENTS

| | | |
|---|---|---|
| DE | 1002210 | 3/1955 |
| DE | 3422588 | 6/1984 |
| DE | 20108416 | 10/2001 |
| DE | 203 16 995 U1 | 2/2004 |
| EP | 0240241 | 12/1992 |
| EP | 0 615 865 A1 | 9/1994 |
| EP | 0790141 | 8/1997 |
| JP | 63-025101 * | 2/1988 |
| JP | 6316204 | 2/1988 |
| JP | 09-002005 * | 1/1997 |

* cited by examiner

BICYCLE HAVING ANNULAR SEALING MEMBER

BACKGROUND OF THE INVENTION

1. Field of the Invention

This invention generally relates to a bicycle rim. More specifically, the present invention relates to a bicycle rim having a seal structure facilitating use with a tubeless tire.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel. Bicycle wheels are constantly being redesigned to be lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are each provided with a flange that is used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage an interior surface of the rim. Alternatively, the spokes may be reversed, with the outer end having the nail head and the inner end having the threads for engaging spoke nipples, which secure the inner ends of the wire spokes to the hub.

The above types of wheels are typically designed for use with a tire and a separate tube used to inflate the tire. However, in recent years, some of the above types of wheels have been designed to be used with tubeless tires. Typically, these wheels utilize a seal mounted to the outer portion of the rim to prevent air leaks. While the use of a seal at the outer portion of the rim generally works well, the prior designs suffer from deficiencies.

Specifically, the use of a seal can allow leaking air even when the rim is relatively new, with certain rim and seal designs. Also, with some designs, the seal may work very well initially but the sealing effectiveness can be reduced, especially after prolonged use. Specifically, when the rider needs to replace the tire due to a puncture or excessive wear of the tire, the old tire needs to be removed and a new tire installed. One or more tire levers are typically used for this purpose. The tire itself and the tire levers can cause damage or wear to the seal during such replacement of the tire. Also, if a spoke needs to be replaced, the tire and the seal both have to be removed from the rim so the spoke can be replaced. Then, the seal and tire need to be reinstalled. Removal and reinstallation of the tire and/or seal can cause the seal and/or tire to be stretched, worn and/or damaged. Even if the seal and tire are not removed, normal riding can also cause wear to some of these prior seals. Specifically, sometimes these prior seals have ribs that support the tire during normal use. These ribs can become worn and/or damaged due to repeated small movements of the tire beads during riding. In any case, if these ribs become worn or damaged, performance of the tire may not be optimal. In other words, with these prior rim and seal designs the sealing effectiveness is not always optimal, especially after prolonged normal use and/or repeated removal and reattachment of the tire and/or seal. Also, with these prior rims, even if the sealing effectiveness is maintained after prolonged use, tire performance can be adversely affected due to wear or damage to the seal.

There are some rims with tubeless tires on the market, which do not include a plurality of holes in the outer portion for mounting the spokes, eliminating the need for an annular seal. Whiles these types of prior rims generally work well, these prior rims for tubeless tires suffer from other deficiencies. Specifically, these rims can be relatively expensive, inconvenient and complicated to manufacture and assemble. Also, these prior rims can be heavier than desired by some riders. More specifically, these prior rims often require a non-traditional spoke mounting structure at the rim, which contributes to the relative cost, complexity, weight, etc. of these types of rims.

In view of the above, it will be apparent to those skilled in the art from this disclosure that there exists a need for an improved bicycle rim for use with a tubeless tire having an improved sealing structure. This invention addresses this need in the art as well as other needs, which will become apparent to those skilled in the art from this disclosure.

SUMMARY OF THE INVENTION

One object of the present invention is to provide a bicycle rim having a seal structure that maintains an airtight seal such that the rim can be used with a tubeless tire.

Another object of the present invention is to provide a bicycle rim having a seal structure that minimizes wear and/or damage to the seal structure during normal riding in order to maintain a tight seal without compromising wheel performance.

Another object of the present invention is to provide a bicycle rim having a seal structure that minimizes wear and/or damage to the seal structure even after numerous tire and/or seal reinstallations in order to maintain a tight seal without compromising wheel performance.

Yet another object of the present invention is to provide a bicycle rim having a seal structure that is relatively simple and inexpensive to manufacture and assemble.

Still another object of the present invention is to provide a bicycle rim having a seal structure that can be used with a tubeless tire, which is relatively strong yet relatively lightweight.

The foregoing objects can basically be attained by providing a bicycle rim that includes first and second annular side portions, an outer annular bridge portion, an annular spoke attachment portion and an annular seal member. The outer annular bridge portion extends between the first and second annular side portions. The annular bridge portion includes first and second annular tire support surfaces, a recessed center surface and first and second ridges. The first and second annular tire support surfaces extend from the first and second annular side portions, respectively. The recessed center surface is arranged between the first and second tire support surfaces to form an annular recess. The first and second ridges are arranged between the recessed center surface and the first and second tire support surfaces, respectively. The recessed center surface has a plurality of circumferentially arranged outer openings formed therein. The annular spoke attachment portion is rigidly coupled with the first and second annular side portions to form an annular hollow area. The annular spoke attachment portion has a plurality of circumferentially arranged inner spoke attachment openings formed therein. The annular seal member is arranged in the annular recess to seal the outer openings from the hollow area. The annular seal member has an outer surface with first and second annular end sections arranged adjacent the first and second ridges.

The foregoing objects can also basically be attained by providing a seal member for use on a rim with a tubeless tire, which includes an inner annular seal portion and an outer annular support portion. The inner annular seal portion is configured to be received in an annular recess of the bicycle rim. The inner annular seal portion is constructed of a first material. The outer annular support portion is mounted on the inner annular seal portion such that the outer annular support portion substantially overlies the inner annular seal portion as viewed in a radial direction. The outer annular support portion is constructed of a second material that is different from the first material.

The foregoing objects can also basically be attained by providing a bicycle rim that includes first and second annular side portions, an annular bridge portion and an annular seal member. The annular bridge portion extends between the first and second annular side portions. The annular bridge portion includes first and second annular tire support surfaces and a recessed center surface. The first and second annular tire support surfaces extend from the first and second annular side portions, respectively. The recessed center surface is arranged between the first and second tire support surfaces to form an annular recess. The recessed center surface has a plurality of circumferentially arranged openings formed therein. The annular seal member is arranged in the annular recess to seal the openings. The annular seal member includes an inner annular seal portion constructed of a first material and an outer annular support portion constructed of a second material that is harder than the first material.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
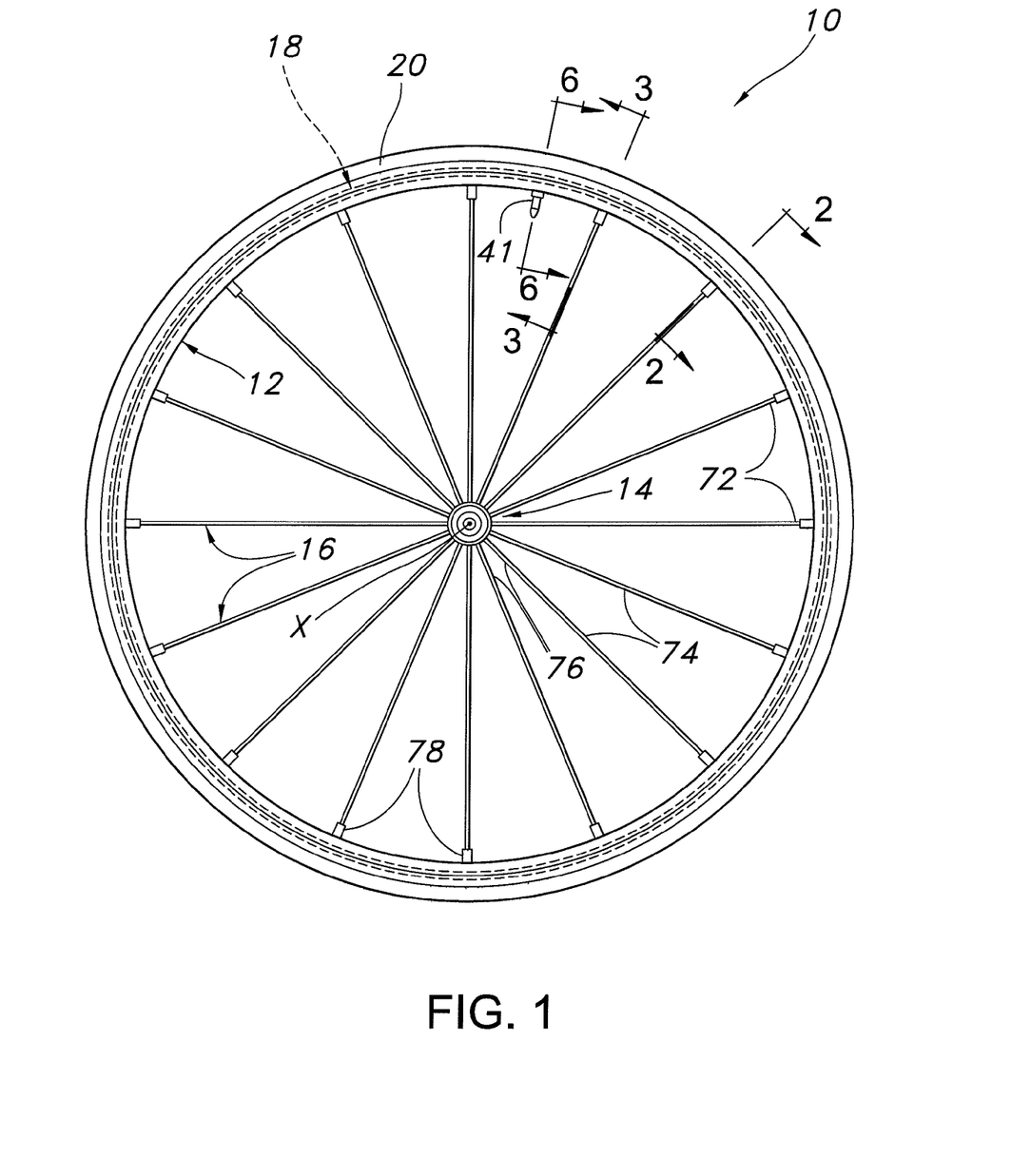
FIG. 1 is a side elevational view of a front bicycle wheel with a rim in accordance with a first embodiment of the present invention.

Referring initially to FIG. 1, a bicycle wheel 10 is illustrated in accordance with a first embodiment of the present invention. The bicycle wheel 10 includes an annular rim 12, a central hub 14 and a plurality of spokes 16 extending between the rim 12 and the central hub 14. The annular rim 12 is provided with an annular seal member 18 mounted thereto in accordance with the present invention in order to form an airtight seal structure together with a portion of the rim 12 such that the rim 12 can be used with a tubeless type bicycle tire 20, as explained below. The rim 12 of the present invention is particularly suited for use with a tubeless tire such as the tire 20. However, it will be apparent to those skilled in the art from this disclosure that other configurations of tubeless tires (not shown) and conventional tube-type tires (not shown) could be used with the rim 12 of the present invention if needed and/or desired.

The central hub 14 is conventional. Thus, the central hub 14 basically includes an axle and a hub shell. The axle is configured to be mounted to a bicycle frame in a conventional manner. The hub shell is configured to freely rotate about the hub axle such that the wheel 10 rotates about a center rotation axis X in a conventional manner. The spokes 16 are coupled to the hub shell in a conventional manner via a pair of axially spaced flanges or the like. The spokes 16 are also coupled to the rim 12 of the present invention, as explained below. Thus, the rim 12 is connected to the central hub 14 for rotation about the rotation axis X. The central hub 14 and the spokes 16 are not critical to the present invention. Accordingly, the central hub 14 and the spokes 16 will not be discussed and/or illustrated in detail herein. Rather, the central hub 14 and the spokes 16 will only be discussed and/or illustrated as needed to make and use the present invention. In other words, it will be apparent to those skilled in the art from this disclosure that various types of conventional spokes and/or conventional hubs can be used with the rim 12 of the present invention in order to construct the wheel 10 of the present invention, as needed and/or desired.

Figure 2:
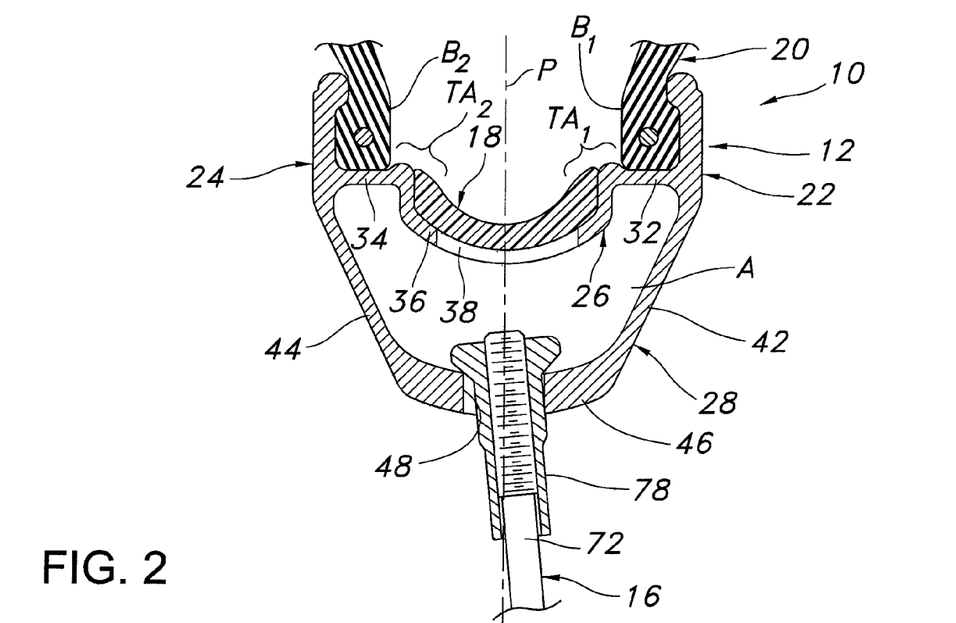
FIG. 2 is an enlarged, partial cross-sectional view of the bicycle wheel illustrated in FIG. 1, as seen along section line 2-2 of FIG. 1.
Figure 3:
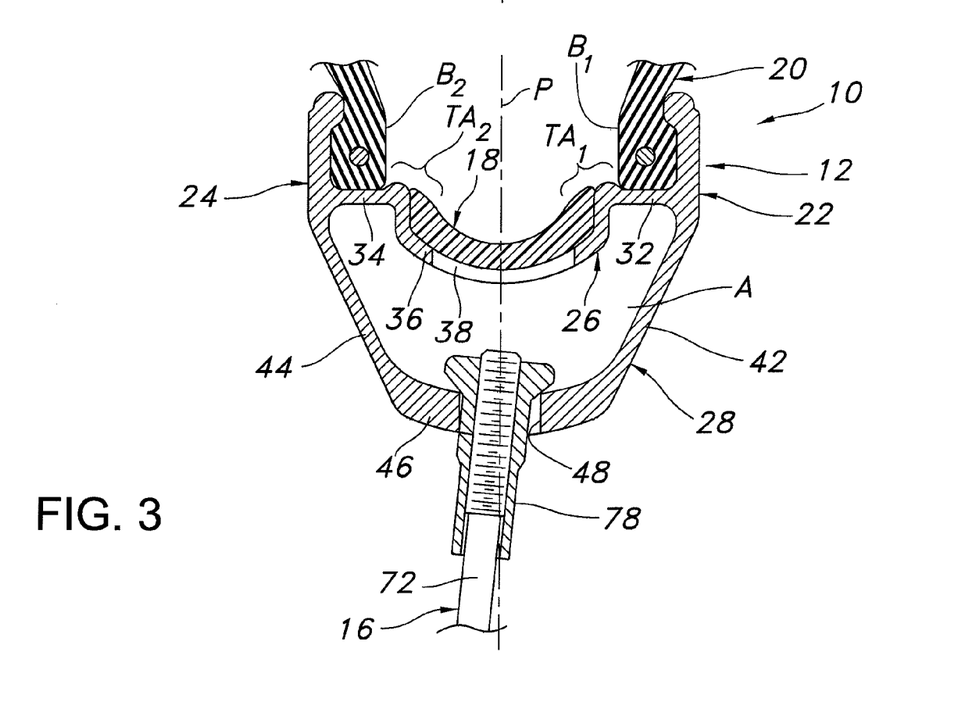
FIG. 3 is an enlarged, partial cross-sectional view of the bicycle wheel illustrated in FIG. 1, as seen along section line 3-3 of FIG. 1.
Figure 4:
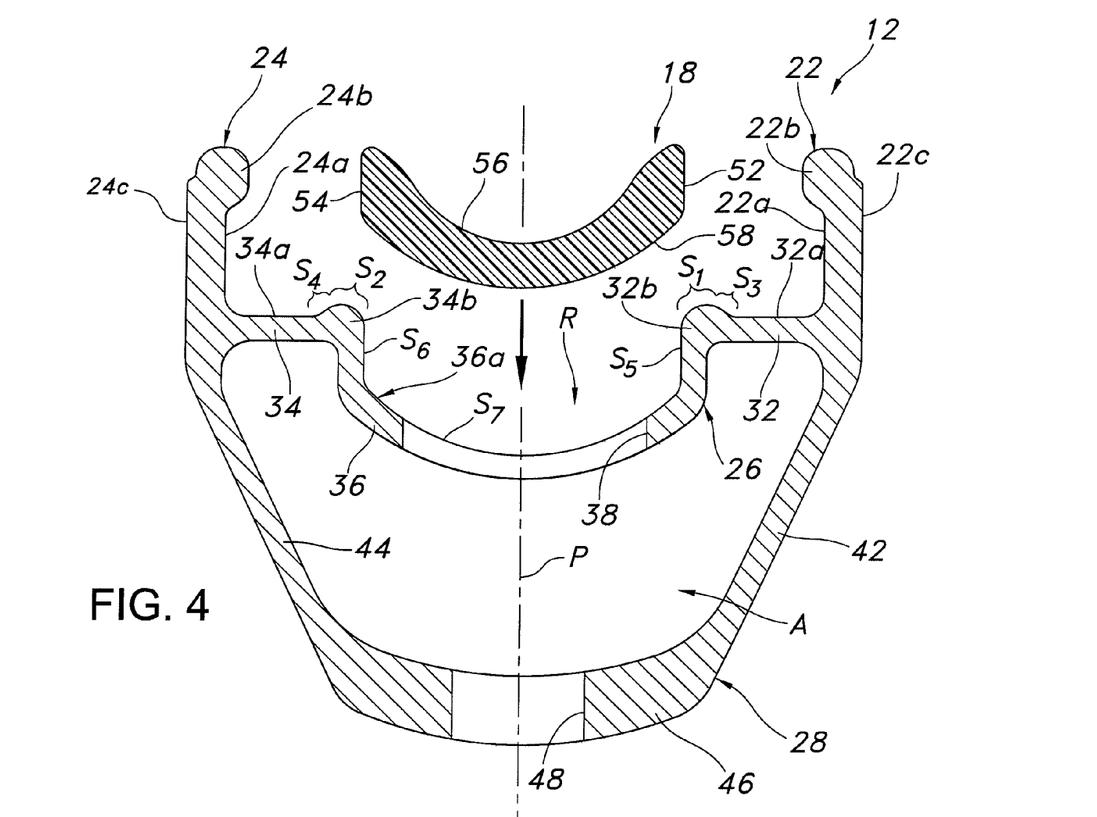
FIG. 4 is a further enlarged, partial cross-sectional view of the bicycle rim illustrated in FIGS. 1-3, with the spokes and tire removed and the seal separated from the rim for the purpose of illustration.

Referring now to FIGS. 1-3, the bicycle rim 12 basically includes a first, annular side portion 22, a second annular side portion 24, an outer annular bridge portion 26, an inner annular spoke attachment portion 28 and the annular seal member 18, which is removably coupled to the rim 12. The annular bridge portion 26 extends substantially axially between the first and second annular side portions 22 and 24. The annular spoke attachment portion 28 is rigidly coupled with the first and second annular side portions 22 and 24 to form an annular hollow area A. Preferably, the first and second side portions 22 and 24, the bridge portion 26 and the spoke attachment portion 28 are integrally formed together as a one-piece unitary member to form a uniform cross-section about the entire circumference of the rim 12, except for the absence of material at certain locations (explained below). Moreover, preferably, the rim 12 is symmetrically shaped relative to a center plane P passing through the center of the bridge portion 26. The seal member 18 is mounted on the outer bridge portion 26 to seal the hollow area A from the radially outward side of the bridge portion 26, as explained below.

The rim 12 is constructed of a lightweight rigid material. For example, the rim 12 can be constructed of any suitable metallic material such as plated steel, stainless steel, aluminum, magnesium, titanium, or other suitable metallic alloys (especially those known in the art) as well as other non-metallic materials, such as a carbon fiber composite. The rim 12 is preferably constructed using conventional manufacturing techniques. For example, the rim 12 can be constructed by first extruding a length of material having the cross-sectional shape illustrated in FIGS. 2 and 3, bending the length of material into an annular shape, and then attaching the ends of the bent length of material together by welding or the like to form the rim 12. The absence of material or openings (explained below) of the rim 12 can be formed either before or after the length of material is bent into an annular shape by punching drilling or the like. Since rim manufacturing techniques and rim materials are well known in the art, they will not be discussed in further detail herein for the sake of brevity.

Referring to FIGS. 1-4, the first and second annular side portions 22 and 24 are preferably annular plate shaped members that are substantially parallel to each other. The first annular side portion 22 has a first annular recessed side surface 22a, a first annular tire retaining rib 22b and a first annular braking surface 22c facing in an opposite direction from the first recessed side surface 22a. The second annular side portion 24 has a second annular recessed side surface 24a, a second annular tire retaining rib 24b and a second annular braking surface 24c facing in an opposite direction from the second recessed side surface 24a. The first and second braking surfaces 22c and 24c are parallel to each other, and configured to engage conventional rim brake pads or shoes. The first and second recessed side surfaces 22a and 24a are also preferably substantially parallel to each other. The first and second tire retaining ribs 22b and 24b extend toward each other to form opposing first and second annular tire retaining surfaces together with the first and second recessed side surfaces 22a and 24a, respectively. The first and second tire support surfaces (formed by the surfaces 22a and 24a and the ribs 22b and 24b, respectively) are configured and arranged to retain first and second annular beads $B_1$ and $B_2$ of the tubeless tire 20.

The outer annular bridge portion 26 is an undulated tubular member that basically includes a first annular tire support element 32, a second annular tire support element 34 and an annular central seal support element 36 extending between the first and second tire support elements 32 and 34. The first tire support element 32 extends substantially axially from the first annular side portion 22, while the second tire support element 34 extends substantially axially from the second annular side portion 24. The first and second tire support elements 32 and 34 are configured and arranged to support the first and second annular beads $B_1$ and $B_2$ of the tubeless tire 20 thereon, respectively. In this embodiment, the first and second tire support elements 32 and 34 are parallel, aligned elements that extend in an axial direction (i.e. parallel to the rotation axis X). The seal support element 36 has a plurality of circumferentially arranged outer access openings 38, as well as a single outer valve mounting opening 40 formed therein, as explained below.

The first tire support element 32 includes a first annular tire support surface 32a and a first annular ridge 32b, while the second tire support element 34 includes a second annular tire support surface 34a and a second annular ridge 34b. The first and second tire support surfaces 32a and 34a preferably extend axially from the first and second annular side portions 22 and 24, respectively. Thus, the first and second tire support surfaces 32a and 34a are preferably cylindrical surfaces that are aligned with each other (i.e. substantially flat, axially extending surfaces, as viewed in transverse cross-section). The first and second annular ridges 32b and 34b project radially further outwardly from the rotation axis X than the first and second tire support surfaces 32a and 34a.

The first annular ridge 32b includes a first convex curved ridge surface $S_1$, while the second annular ridge 34b includes a second convex curved ridge surface $S_2$. Also, the first annular ridge 32b includes a first inclined ridge surface $S_3$, while the second annular ridge 34b includes a second inclined ridge surface $S_4$. The first and second convex curved ridge surfaces $S_1$ and $S_2$ extend from seal support element 36. The first and second inclined ridge surfaces $S_3$ and $S_4$ extend between the first and second curved ridge surfaces $S_1$ and $S_2$ and the first and second tire support surfaces 32a and 34a, respectively. Thus, the first and second inclined ridge surfaces $S_3$ and $S_4$ connect the first and second curved ridge surfaces $S_1$ and $S_2$ to the first and second tire support surfaces 32a and 34a, respectively. The first and second convex curved ridge surfaces $S_1$ and $S_2$ have first and second curvatures (i.e. radii of curvature as viewed in cross-section) that are configured to form first and second substantially smooth transition areas $TA_1$ and $TA_2$ between the annular seal member 18 and the first and second ridges 32b and 34b, respectively, as explained below in more detail. The first and second convex curved ridge surfaces $S_1$ and $S_2$ preferably have identical curvatures.

The central seal support element 36 is basically a tubular element with a substantially U-shape as viewed in transverse cross-section. The central seal support element 36 basically includes an annular recessed center surface 36a arranged between the first and second tire support surfaces 32a and 34a to form an annular recess R. Specifically, the recessed center surface 36a faces radially outwardly, has a U-shaped configuration, and extends between the first and second curved ridge surfaces $S_1$ and $S_2$ of the first and second ridges 32b and 34b. Thus, the first and second ridges 32b and 34b are arranged between the recessed center surface 36a and the first and second tire support surfaces 32a and 34a, respectively. The recessed center surface 36a has the plurality of circumferentially arranged outer access openings 38 as well as the single outer valve mounting opening 40 formed therein.

The recessed center surface 36a is arranged and configured to support the seal member 18 thereon. Specifically, the recessed center surface 36a includes first and second opposed annular side sections $S_5$ and $S_6$ and a concave connecting section $S_7$ extending between the first and second side sections $S_5$ and $S_6$ to form the annular recess R. The first and second annular side sections $S_5$ and $S_6$ are substantially parallel in this embodiment such that the seal member 18 can slide radially into and out of the recess R with relative ease.

The outer access openings 38 facilitate mounting of the spokes 16 to the spoke attachment portion 28, as explained below in more detail. The outer valve mounting opening 40 is configured to receive part of a valve 41 therein, as also explained below. Preferably, the outer access openings 38 are circumferentially equally spaced about the circumference of the rim 12, as best understood from FIG. 1. However, it will be apparent to those skilled in the art from this disclosure that the configuration of (i.e. the number and spacing of) the outer access openings 38 will depend on what spoking arrangement is desired. In the illustrated embodiment, the wheel 10 utilizes sixteen (16) equally spaced radial spokes 16. Accordingly, in the illustrated embodiment, the rim 12 preferably has sixteen (16) equally spaced outer access openings 38 that are radially aligned with the spokes 16.

Referring still to FIGS. 1-4, the annular spoke attachment portion 28 basically includes a first annular inclined connecting element 42, a second annular inclined connecting element 44 and a relatively thicker spoke attachment element 46 extending between the first and second connecting elements 42 and 44. The first and second inclined connecting elements 42 and 44 connect the first and second side portions 22 and 24 to the spoke attachment element 46. Thus, the first and second inclined connecting elements 42 and 44 are opposed to each other. The spoke attachment element 46 has a plurality of circumferentially arranged inner spoke attachment openings 48, as well as a single inner valve mounting opening 50 formed therein. The inner spoke attachment openings 48 are substantially aligned with the outer access openings 38, while the single inner valve mounting opening 50 is aligned with the single outer valve mounting opening 40. Thus, the spoke attachment openings 48 are preferably circumferentially equally spaced, as best understood from FIG. 1. The spoke attachment openings are configured and arranged to receive the spokes 16 therein to attach the rim 12 to the central hub 14 in a conventional manner.

The spoke attachment openings 48 can be radially extending openings (as illustrated herein) that are sufficiently large to allow the spokes 16 to be inclined relative to the center plane P in an alternating manner about the circumference of the rim 12. Of course, when the spoke attachment openings 48 are sufficiently large radial openings, the spokes 16 could also be inclined radially if needed for a particular spoking arrangement (e.g. including at least some tangential spokes) even though the spokes 16 are illustrated as radial spokes in this embodiment. Alternatively, the spoke attachment openings 48 can be formed such that they are smaller but inclined relative to the center plane P in a circumferentially alternating manner about the circumference of the rim 12. Of course, if a particular spoking arrangement is desired (e.g. including at least some tangential spokes), the spoke attachment openings 48 would also be inclined in the radial direction in such an arrangement.

Referring to FIGS. 1-5, the seal member 18 will now be explained in more detail. As mentioned above, the annular seal member 18 is arranged in the annular recess R to seal the outer openings 38 from the hollow area A. The seal member 18 basically includes a first annular side sealing surface 52, a second annular side sealing surface 54, an outer annular surface 56, an inner annular sealing surface 58 and a single valve receiving opening 60. The outer and inner surfaces 56 and 58 extend substantially axially between the first and second side sealing surfaces 52 and 54. The valve receiving opening 60 extends radially between the outer and inner surfaces 56 and 58.

In this embodiment, the seal member 18 is preferably constructed as a one-piece unitary member having a uniform cross-sectional shape about the entire circumference of the seal member 18, except for the absence of material at the single valve receiving opening 60. Moreover, the seal member 18 is preferably symmetrical relative to the center plane P. Furthermore, in this embodiment, the seal member 18 is preferably constructed of a single material. However, it will be apparent to those skilled in the art from this disclosure that the seal member could be constructed of two or more different materials, as needed and/or desired. The seal member 18 is preferably constructed using conventional manufacturing techniques such as molding from a somewhat flexible, elastic material. For example, the seal member 18 is preferably molded of (1) thermoplastic polyolefin resin (such as polyethylene or polypropylene), (2) thermoplastic polyurethane, or (3) thermoplastic elastomer using conventional techniques to achieve the cross-sectional shape illustrated in FIG. 4.

Figure 5:
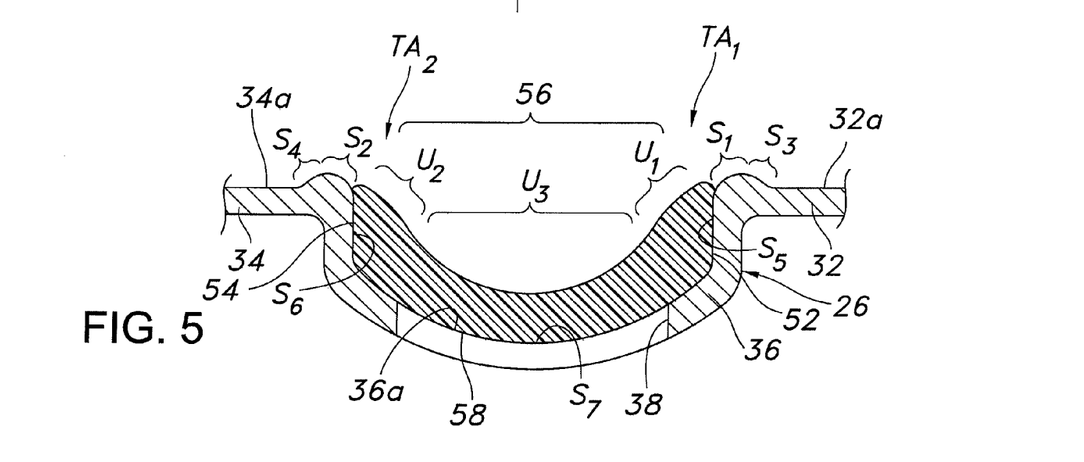
FIG. 5 is a further enlarged, partial cross-sectional view of the outer bridge portion and the seal member of the rim illustrated in FIGS. 1-4, with the seal member installed on the outer bridge portion.

The outer surface 56 includes first and second annular end sections $U_1$ and $U_2$ and a curved center section $U_3$ extending between the first and second annular end sections $U_1$ and $U_2$. The first and second annular end sections $U_1$ and $U_2$ are arranged adjacent the first and second ridges 32b and 34b when the seal member 18 is mounted to the rim 12 to form the first and second substantially smooth transition areas $TA_1$ and $TA_2$ therebetween, respectively, as best seen in FIG. 5. Specifically, the first and second annular end sections $U_1$ and $U_2$ are convexly curved surfaces that have curvatures (i.e. radii of curvature as viewed in cross-section) that are substantially identical to the first and second curvatures (i.e. radii of curvature as viewed in cross-section) of the first and second convex curved ridge surfaces $S_1$ and $S_2$, respectively, to form the first and second substantially smooth, annular transition areas $TA_1$ and $TA_2$ therebetween, respectively. Also, in this embodiment, the free ends of the first and second annular end sections $U_1$ and $U_2$ are preferably substantially radially aligned with the free ends of the first and second convex curved ridge surfaces $S_1$ and $S_2$, respectively. However, radially outermost points of the first and second ridges 32b and 34b are located radially outward of the first and second end sections $U_1$ and $U_2$ of the outer surface 56.

The center section $U_3$ is a concavely curved surface that is contiguously connected to the first and second end sections $U_1$ and $U_2$ to form a smooth, contoured outer surface 56. A radially innermost point of the center section $U_3$ is located radially inwardly of the first and second tire support elements 32 and 34. Thus, the outer surface 56 of the seal member 18 has a radially innermost point located completely radially inwardly of the first and second tire support elements 32 and 34. The first and second end sections $U_1$ and $U_2$, the center section $U_3$ and the first and second ridges 32b and 34b are arranged and configured such that the first and second tire beads $B_1$ and $B_2$ can slide relative easily on the outer surface 56 over the first and second ridges 32b and 34b onto the first and second tire support elements 32 and 34.

The inner sealing surface 58 of the seal member 18 is in continuous contact with the concave connecting section $S_7$ of the recessed center surface 36a, except at the outer access openings 38 and the location of the single valve mounting opening 40 formed in the recessed center surface 36a. In other words, the inner sealing surface 58 overlies the outer access openings 38, while the valve receiving opening 60 is aligned with the outer valve mounting opening 40. Similarly, the first and second side sealing surfaces 52 and 54 are preferably in continuous contact with the first and second side sections $S_5$ and $S_6$, respectively, of the recessed center surface 36a.

Figure 6:
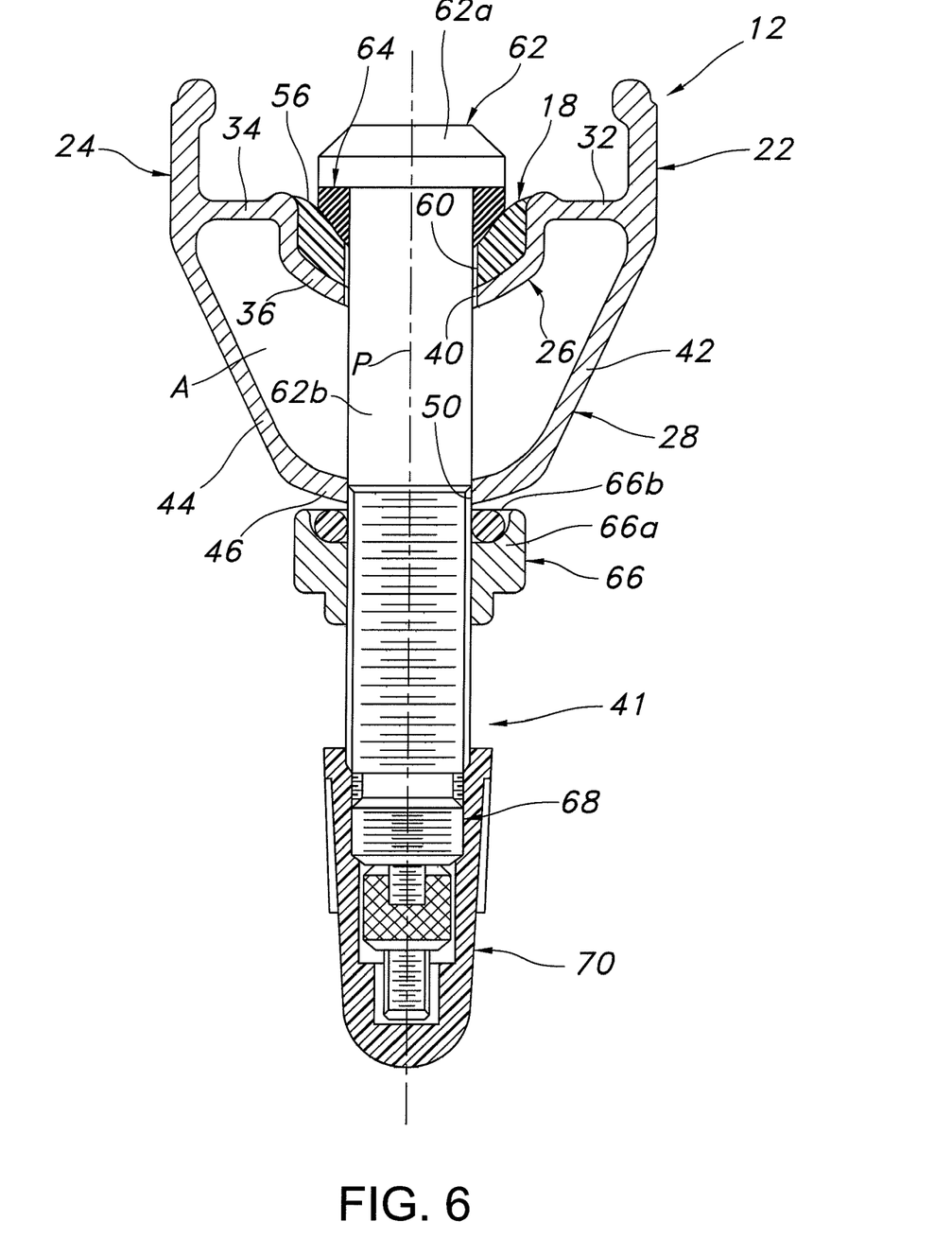
FIG. 6 is an enlarged, partial cross-sectional view of the bicycle wheel illustrated in FIG. 1, as seen along section line 6-6 of FIG. 1, with the tire removed for the purpose of illustration.

Referring now to FIGS. 1 and 6, the valve 41 will now be explained in more detail. The valve 41 is a Presta-type valve that is mounted in the valve mounting openings 40 and 50 of the rim 12, and in the valve receiving opening 60 of the seal member 18. The internal workings of Presta-type valves such as the valve 41 are well known in the bicycle art. The parts (internal workings) of the valve 41 are configured such that a pump can be used to push air through valve 41 (via an internal passageway that is not shown) to the area located radially outwardly of the bridge portion 26 to inflate the tire 20 in a conventional manner. Accordingly, the valve 41 will not be explained and/or illustrated in detail herein, except as related to the present invention. The valve 41 basically includes a main body portion 62, a seal element 64, a retaining member 66, a valve structure 68 and a cap 70.

The main body portion 62 of the valve 41 has an enlarged head 62a and a partially threaded shaft 62b extending from the enlarged head 62a. The seal element 64 is mounted on the shaft 62b adjacent the enlarged head 62a. The seal element 64 is preferably constructed of a rubber or plastic material, or the same material as the seal member 18. Alternatively, the seal element 64 could be constructed of a metallic material since the seal member 18 is constructed of a sealing material. In any case, the lower surface of the seal element 64 is preferably shaped to contact the outer surface 56 of the seal member 18 in an area surrounding the opening 60 to seal the opening 60 from the hollow area A. The valve structure 68 is mounted at the free end of the shaft 62b of the main body portion 62. The retaining member 66 is threaded onto the shaft 62b to retain the valve 41 within the openings 40, 50 and 60. Moreover, the retaining member 66 and the shaft 62b are preferably arranged and configured to hold the seal element 64 in tight contact with the outer surface 56 of the seal member 18. The retaining member 66 includes a nut portion 66a and a washer 66b received in a recess of the nut portion 66a. The washer 66b is preferably constructed of plastic or rubber, and engages the shaft 62b and/or an exterior surface of the spoke attachment element 46. The cap 70 is threadedly mounted on the valve structure 68.

Referring again to FIGS. 1-3, each of the spokes 16 includes a threaded outer end 72, an elongated central portion 74, an inner end 76 and a spoke nipple 78 threadedly mounted on the outer end 72. The inner ends 76 are configured to be coupled to the central hub 14 in a conventional manner. For example, the inner ends 76 could be shaped as bent nail heads that are retained holes formed in annular flanges of the central hub 14 in a conventional manner. As mentioned above, the central hub is not critical to the present invention. Accordingly, it will be apparent to those skilled in the art from this disclosure that the inner ends 76 of the spokes 16 can have various configurations as needed and/or desired depending on the type of hub needed and/or desired.

Referring to FIGS. 1-6, assembly of the bicycle wheel 10 will now be explained in more detail. The seal member 18 and the rim 12 are provided as separate members. The spokes 16 are coupled to the rim 12 using the spoke nipples 78. Specifically, the spoke nipples 78 are inserted through the access openings 38 and into the spoke attachment openings 48. The outer ends 72 of the spokes 16 are then threadedly coupled to the spoke nipples 78. The inner ends 76 of the spokes can be coupled to the central hub 14 before or after the outer ends 72 are coupled to the rim 12 via the spoke nipples 78, depending on the type of central hub used. If the inner ends 76 of the spokes 16 are formed as bent nail heads, the inner ends 76 of the spokes 16 should usually be connected to the central hub 14 before the outer ends 72 are connected to the rim 12.

In any case, once the spokes 16 are coupled to the rim 12 using the spoke nipples 78, the annular seal member 18 is installed on the outer bridge portion 26 of the rim 12 using tire levers or the like. Specifically, the seal member 18 is mounted in the annular recess R. Once the seal member 18 is installed, the valve 41 is installed. Alternatively, the valve 41 can be inserted through the opening 60 of the seal member 18 prior to installing the seal member 18 on the rim 12 in order circumferentially orient the seal member 18 relative to the rim 12. In any case, the valve 41 is basically assembled prior to installation, except that the retaining member 66 and the cap 70 are removed. In other words, the seal element 64 is mounted on the shaft 62b of the main body portion 62 adjacent the enlarged head 62a, and the valve structure 68 is mounted within the shaft 62b. The shaft 62b is then inserted through the opening 60 of the seal member 18, through the outer valve mounting opening 40 and through the inner valve mounting opening 50 such that the seal element 64 contacts the outer surface 56 of the seal member 18 to form an airtight seal around the opening 60. Then the retaining member 66 is threaded onto the shaft 62b of the main body portion 62 to retain the valve 41. The cap 70 is mounted after the retaining member 66. Once the valve 41 is installed, the tire 20 is mounted on the rim 12 using tire levers or the like, and inflated using the valve 41 and a conventional air pump.

Second Embodiment

Figure 7:
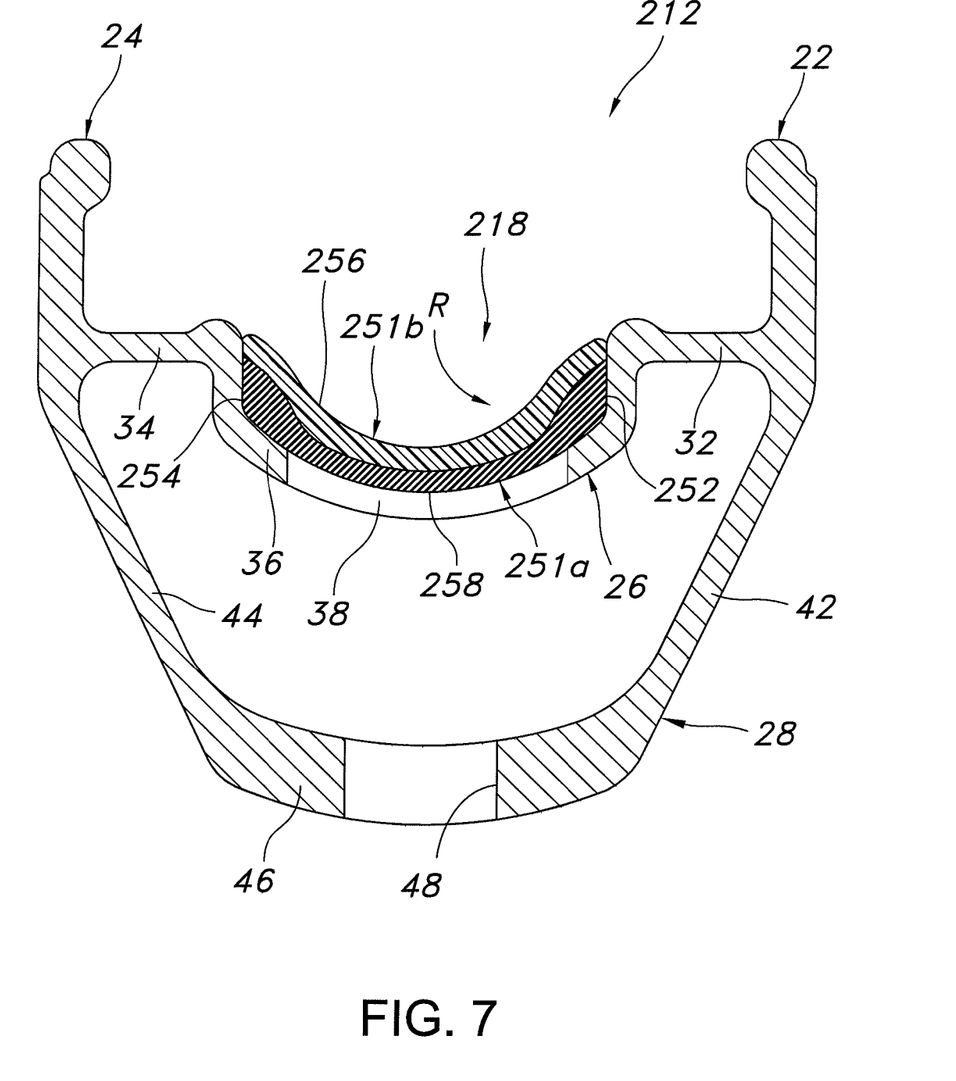
FIG. 7 is an enlarged, partial cross-sectional view of a bicycle rim with a modified seal member in accordance with a second embodiment of the present invention, with the spoke and tire removed for the purpose of illustration.

Referring now to FIG. 7, an annular bicycle rim 212 with a modified annular seal member 218 in accordance with a second embodiment will now be explained. The rim 212 of this second embodiment is identical to the rim 12 of the first embodiment, except the rim 212 has the modified seal member 218 mounted thereto. The seal member 218 is a modified version of the seal member 18 of the first embodiment. Specifically, the seal member 218 of this second embodiment is constructed of two different materials (e.g. layers) in this second embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. On the other hand, parts of this second embodiment that are functionally identical (i.e. not exactly alike but perform the same function) to parts of the first embodiment will be given the same reference numerals/characters, but with "200" added thereto for the sake of convenience. In any case, in view of the similarities between the first and second embodiments, it will be apparent to those skilled in the art from this disclosure that the descriptions and illustrations of the first embodiment also apply to this second embodiment, except as explained and/or illustrated herein.

The seal member 218 basically includes an inner annular seal portion 251a and an outer annular support portion 251b attached to the inner annular seal portion 251a. The seal member 218 has the same size and shape as the seal member 18 when the two parts are attached together. Thus, the seal member 218 includes a first annular side sealing surface 252, a second annular side sealing surface 254, an outer annular surface 256, an inner annular sealing surface 258 and a single valve receiving opening (not shown) identical in size and shape to the corresponding parts of the first embodiment. The inner annular seal portion 251a is configured to be received in the annular recess R of the bicycle rim 212. The outer annular support portion 251b is mounted on the inner annular seal portion 251a such that the outer annular support portion 251b substantially overlies the inner annular seal portion 251a as viewed in a radial direction.

The inner annular seal portion 251a is constructed of a first material, while the outer annular support portion 251b is constructed of a second material that is different from the first material. Preferably, the second material is harder than the first material. For example, the outer support portion 251b of the seal member 218 is preferably molded of (1) thermoplastic polyolefin resin (such as polyethylene or polypropylene), while the inner seal portion 251a is preferably molded of (2) thermoplastic polyurethane, (3) thermoplastic elastomer, or rubber. Accordingly, the second material preferably includes a plastic (or plastic based) material and the first material preferably includes a rubber (or rubber based) material. The inner seal portion 251a and the outer support portion 251b can be molded separately and then bonded together by adhesive or the like. Alternatively, the inner seal portion 251a and the outer support portion 251b can be molded together simultaneously, or one of the inner seal portion 251a and the outer support portion 251b can be molded first and then the other of the inner seal portion 251a and the outer support portion 251b can be molded onto the first molded piece such that they are bonded together.

The inner sealing surface 258 is formed on the inner seal portion 251a, while the outer surface 256 is formed on the outer support portion 251b. The first and second side sealing surfaces 252 and 254 extend along both the inner seal portion 251a and the outer support portion 251b. The outer support portion 251b of the seal member 218 preferably has an axial length substantially equal to an axial length of the inner seal portion 251a such that the outer support portion 251 substantially overlies the inner seal portion 251a as viewed in a radial direction. Also, each of the inner seal portion 251a and the outer support portion 251b preferably have a radial thickness that is at least about 10% of an overall radial thickness of the seal member 218. In other words, neither the inner seal portion 251a nor the outer support portion 251b is preferably formed as a very thin coating. In this embodiment, the outer support portion 251b of the seal member 218 has a substantially uniform radial thickness, while the inner seal portion 251a of the seal member 218 has a radial thickness substantially equal to the radial thickness of the outer support portion 251b, except that the inner seal portion 251a is slightly thicker at the axial ends thereof.

It will be apparent to those skilled in the art from this disclosure that the seal members of the third, fourth, fifth and sixth embodiments of the present invention, discussed below, can be constructed of two materials in accordance with this second embodiment.

Third Embodiment

Figures 8, 9:
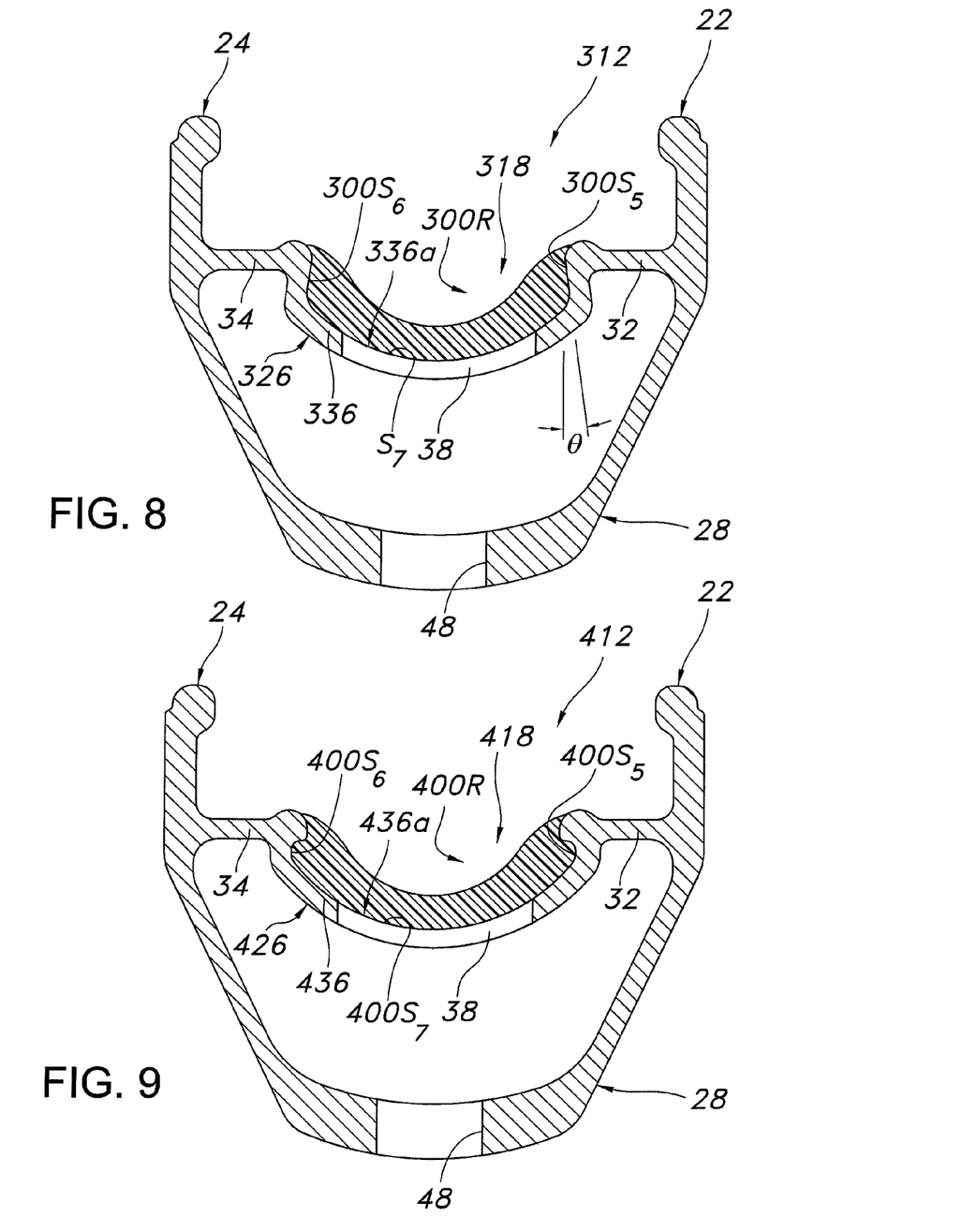
FIG. 8 is an enlarged, partial cross-sectional view of a modified bicycle rim with a modified seal member in accordance with a third embodiment of the present invention, with the spoke and tire removed for the purpose of illustration.
FIG. 9 is an enlarged, partial cross-sectional view of a modified bicycle rim with a modified seal member in accordance with a fourth embodiment of the present invention, with the spoke and tire removed for the purpose of illustration.

Referring now to FIG. 8, a modified annular bicycle rim 312 with a modified annular seal member 318 in accordance with a third embodiment will now be explained. The rim 312 of this third embodiment is identical to the rim 12 of the first embodiment, except the modified rim 312 has the modified outer annular bridge portion 326 with a modified seal member 318 mounted thereto. Specifically, the outer bridge portion 326 and the modified seal member 318 are configured and arranged to normally prevent outward radial movement of the seal member 318 relative to the outer bridge portion 326 once the seal member 318 is installed. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. On the other hand, parts of this third embodiment that are functionally identical (i.e. not exactly alike but substantially perform the same function) to parts of the first embodiment will be given the same reference numerals/characters, but with "300" added thereto for the sake of convenience. In any case, in view of the similarities between the first and third embodiments, it will be apparent to those skilled in the art from this disclosure that the descriptions and illustrations of the first embodiment also apply to this third embodiment, except as explained and/or illustrated herein.

The modified outer bridge portion 326 includes a modified seal support element 336 with a recessed center surface 336a that forms a modified annular recess 300R. The recessed center surface 336a includes first and second opposed annular side sections $300S_5$ and $300S_6$ and a concave connecting section $S_7$ extending between the first and second side sections $300S_5$ and $300S_6$ to form the annular recess 300R. The first annular side section $300S_5$ includes a first outer end and a first inner end located radially inwardly of the first outer end. The second annular side section $300S_6$ includes a second outer end and a second inner end located radially inwardly of the second outer end. The first and second outer ends of the first and second side sections $300S_5$ and $300S_6$ project axially toward each other to form first and second axially extending projections, respectively. In this embodiment, the first and second side sections $300S_5$ and $300S_6$ are substantially flat, tapered surfaces that are inclined an angle $\Theta$ (of about 10°) relative to the center plane of the rim passing through the curved connecting section $S_7$ to form the first and second projections, as viewed in transverse cross-section. The modified seal 318 is identical to the seal 18 of the first embodiment, except the seal 318 has a cross-sectional shape such as illustrated in FIG. 8 (i.e. corresponding to the shape of the recessed center surface 336a).

Fourth Embodiment

Referring now to FIG. 9, a modified annular bicycle rim 412 with a modified annular seal member 418 in accordance with a fourth embodiment will now be explained. The rim 412 of this fourth embodiment is identical to the rim 12 of the first embodiment, except the modified rim 412 has the modified outer annular bridge portion 426 with a modified seal member 418 mounted thereto. Specifically, the outer bridge portion 426 and the modified seal member 418 are configured and arranged to normally prevent outward radial movement of the seal member 418 relative to the outer bridge portion 426 once the seal member 418 is installed. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. On the other hand, parts of this fourth embodiment that are functionally identical (i.e. not exactly alike but substantially perform the same function) to parts of the first embodiment will be given the same reference numerals/characters, but with "400" added thereto for the sake of convenience. In any case, in view of the similarities between the first and fourth embodiments, it will be apparent to those skilled in the art from this disclosure that the descriptions and illustrations of the first embodiment also apply to this fourth embodiment, except as explained and/or illustrated herein.

The modified outer bridge portion 426 includes a modified seal support element 436 with a recessed center surface 436a that forms a modified annular recess 400R. The recessed center surface 436a includes first and second opposed annular side sections $400S_5$ and $400S_6$ and a concave connecting section $400S_7$ extending between the first and second side sections $400S_5$ and $400S_6$ to form the annular recess 400R. The concave connecting section $400S_7$ is identical to the concave connecting section $S_7$, except it extends slightly further in the substantially axial direction due to the configuration of the first and second side sections $400S_5$ and $400S_6$. The first annular side section $400S_5$ includes a first outer end and a first inner end located radially inwardly of the first outer end. The second annular side section $400S_6$ includes a second outer end and a second inner end located radially inwardly of the second outer end. The first and second outer ends of the first and second side sections $400S_5$ and $400S_6$ project axially toward each other to form first and second axially extending projections, respectively. In this embodiment, the first and second inner ends of the first and second annular side section $400S_5$ and $400S_6$ are concavely curved (as viewed in cross-section such as in FIG. 9), and the first and second outer ends of the first and second annular side section $400S_5$ and $400S_6$ are offset axially toward each other from the first and second inner ends to form the first and second projections, respectively. The modified seal 418 is identical to the seal 18 of the first embodiment, except the seal 418 has a cross-sectional shape such as illustrated in FIG. 9 (i.e. corresponding to the shape of the recessed center surface 436a).

Fifth Embodiment

Figure 10:
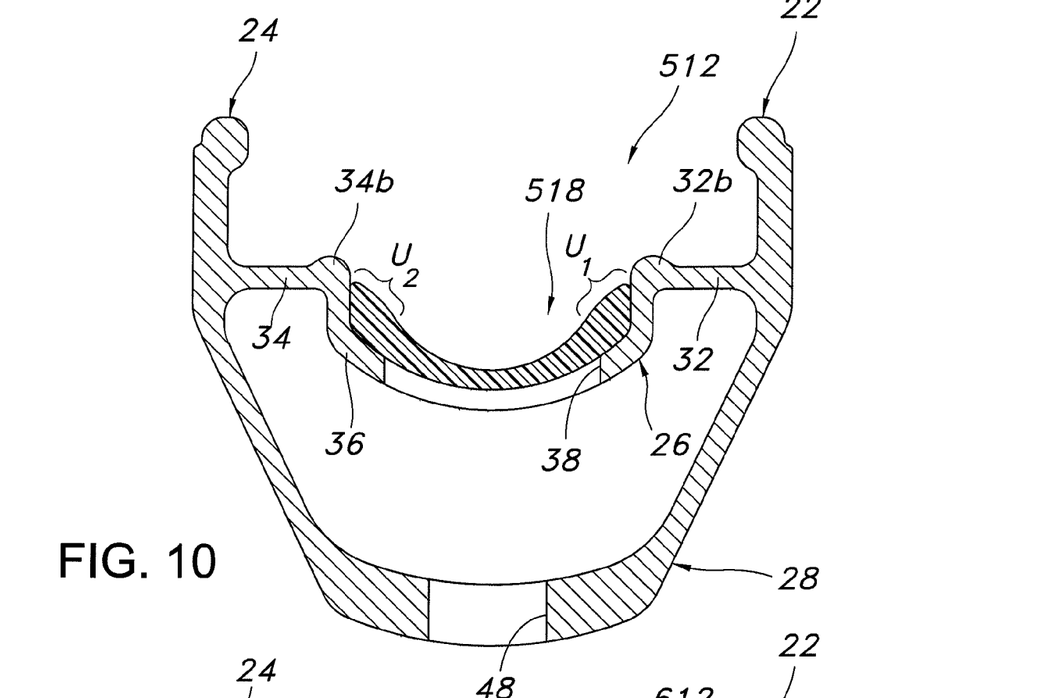
FIG. 10 is an enlarged, partial cross-sectional view of a bicycle rim with a modified seal member in accordance with a fifth embodiment of the present invention, with the spoke and tire removed for the purpose of illustration.

Referring now to FIG. 10, an annular bicycle rim 512 with a modified annular seal member 518 in accordance with a fifth embodiment will now be explained. The rim 512 of this fifth embodiment is identical to the rim 12 of the first embodiment, except the rim 512 has the modified seal member 518 mounted thereto. The seal member 518 is a modified version of the seal member 18 of the first embodiment. Specifically, the seal member 518 of this fifth embodiment is constructed to be thinner than the seal member 18 of the first embodiment. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. On the other hand, parts of this fifth embodiment that are functionally identical (i.e. not exactly alike but substantially perform the same function) to parts of the first embodiment will be given the same reference numerals/characters, but with "500" added thereto for the sake of convenience. In any case, in view of the similarities between the first and fifth embodiments, it will be apparent to those skilled in the art from this disclosure that the descriptions and illustrations of the first embodiment also apply to this fifth embodiment, except as explained and/or illustrated herein.

The annular seal member 518 is identical to the seal member 18 of the first embodiment, except the seal member 518 is thinner as measured radially. Due to the thinner construction of the seal member 518, first and second end sections $U_1$ and $U_2$ of the seal member 518 are located radially inwardly of the first and second ridges 32b and 34b, respectively.

Sixth Embodiment

Figure 11:
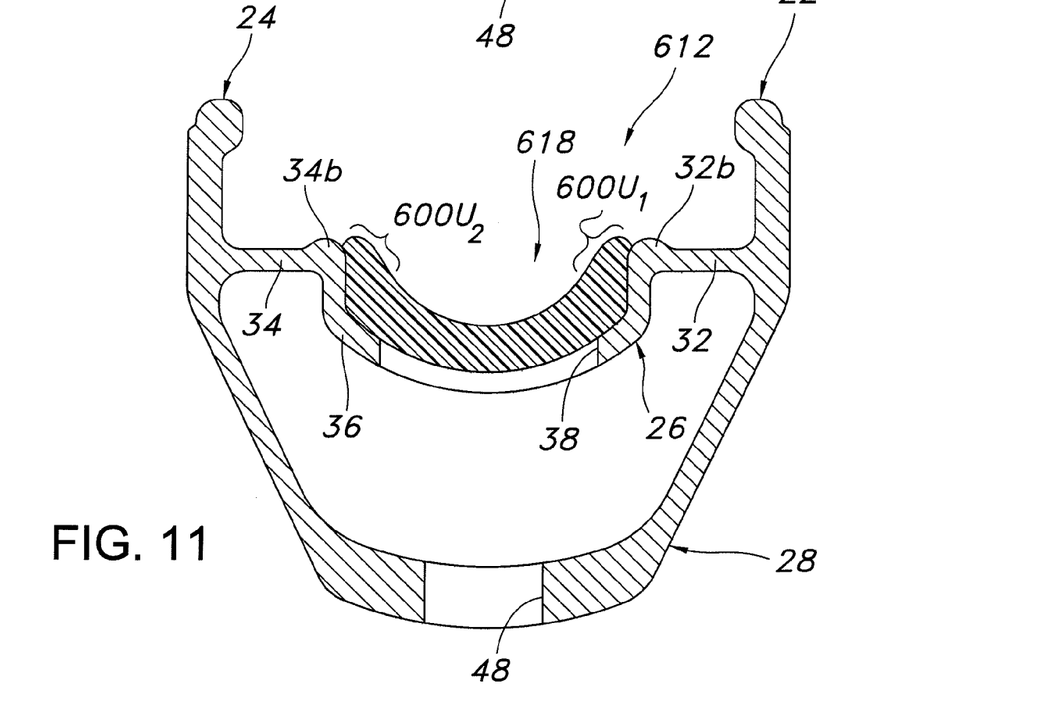
FIG. 11 is an enlarged, partial cross-sectional view of a bicycle rim with a modified seal member in accordance with a sixth embodiment of the present invention, with the spoke and tire removed for the purpose of illustration.

Referring now to FIG. 11, an annular bicycle rim 612 with a modified annular seal member 618 in accordance with a sixth embodiment will now be explained. The rim 612 of this sixth embodiment is identical to the rim 12 of the first embodiment, except the rim 612 has the modified seal member 618 mounted thereto. The seal member 618 is a modified version of the seal member 18 of the first embodiment. Specifically, the seal member 618 of this sixth embodiment is constructed to be thicker than the seal member 18 of the first embodiment. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity. On the other hand, parts of this sixth embodiment that are functionally identical (i.e. not exactly alike but substantially perform the same function) to parts of the first embodiment will be given the same reference numerals, but with "600" added thereto for the sake of convenience. In any case, in view of the similarities between the first and sixth embodiments, it will be apparent to those skilled in the art from this disclosure that the descriptions and illustrations of the first embodiment also apply to this sixth embodiment, except as explained and/or illustrated herein.

The annular seal member 618 is identical to the seal member 18 of the first embodiment, except the seal member 618 is thicker as measured radially. Due to the thicker construction of the seal member 618, the seal member 618 preferably has modified first and second end sections $600U_1$ and $600U_2$ that have rounded free ends or corners. Moreover, due to the thicker construction of the seal member 618, radially outermost edges of the first and second end sections $600U_1$ and $600U_2$ of the seal member 518 are located radially outwardly of the first and second ridges 32b and 34b, respectively.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" and other similar terms when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rim comprising:
   first and second annular side portions;
   an outer annular bridge portion extending between the first and second annular side portions, the annular bridge portion including first and second radially outwardly facing annular tire support surfaces extending from the first and second annular side portions, respectively, a recessed center surface arranged between the first and second tire support surfaces to form an annular recess, and first and second ridges extending between the recessed center surface and the first and second tire support surfaces, respectively, the first and second ridges projecting radially outwardly from the first and second tire support surfaces and being integrally formed with the annular bridge portion, the recessed center surface having a plurality of circumferentially arranged outer openings formed therein;
   an annular spoke attachment portion rigidly coupled with the first and second annular side portions to form an annular hollow area, the annular spoke attachment portion having a plurality of circumferentially arranged inner spoke attachment openings formed therein; and
   an annular seal member removably arranged in the annular recess to seal the outer openings from the hollow area when arranged in the annular recess, the annular seal member being a continuous annular member that extends circumferentially continuously within the annular recess when arranged in the annular recess and having an outer surface with first and second annular end sections arranged adjacent the first and second ridges of the annular bridge portion when the annular seal member is arranged in the annular recess,
   radially outermost points of the first and second ridges being located radially outwardly of the first and second end sections of the outer surface of the seal member, and the first and second end sections of the outer surface being convexly curved.

2. The bicycle rim according to claim 1, wherein the outer surface includes a concavely curved center section contiguously connected to the first and second end sections to form a smooth, contoured outer surface of the seal member.

3. The bicycle rim according to claim 1, wherein the first ridge includes a first convex curved ridge surface extending from the annular recess and the second ridge includes a second convex curved ridge surface extending from the annular recess.

4. The bicycle rim according to claim 3, wherein the first end section of the outer surface and the first convex curved ridge surface of the first ridge have substantially identical curvatures; and
   the second end section of the outer surface and the second convex curved ridge surface of the second ridge have substantially identical curvatures.

5. A bicycle rim comprising:
   first and second annular side portions;
   an outer annular bridge portion extending between the first and second annular side portions, the annular bridge portion including first and second radially outwardly facing annular tire support surfaces extending from the first and second annular side portions, respectively, a recessed center surface arranged between the first and second tire support surfaces to form an annular recess, and first and second ridges extending between the recessed center surface and the first and second tire support surfaces, respectively, the first and second ridges Projecting radially outwardly from the first and second tire support surfaces and being integrally formed with the annular bridge portion, the recessed center surface having a plurality of circumferentially arranged outer openings formed therein;
   an annular spoke attachment portion rigidly coupled with the first and second annular side portions to form an annular hollow area, the annular spoke attachment portion having a plurality of circumferentially arranged inner spoke attachment openings formed therein; and
   an annular seal member removably arranged in the annular recess to seal the outer openings from the hollow area when arranged in the annular recess, the annular seal member being a continuous annular member that extends circumferentially continuously within the annular recess when arranged in the annular recess and having an outer surface with first and second annular end sections arranged adjacent the first and second ridges of the annular bridge portion when the annular seal member is arranged in the annular recess,
   the first and second annular end sections and the first and second ridges forming first and second substantially smooth transition areas therebetween, respectively.

6. The bicycle rim according to claim 5, wherein the seal member includes an inner surface in continuous contact with the recessed center surface, except at the outer openings and a location of a single valve opening formed in the recessed center surface.

7. A bicycle rim comprising:
   first and second annular side portions;
   an outer annular bridge portion extending between the first and second annular side portions, the annular bridge portion including first and second radially outwardly facing annular tire support surfaces extending from the first and second annular side portions, respectively, a recessed center surface arranged between the first and second tire support surfaces to form an annular recess, and first and second ridges extending between the recessed center surface and the first and second tire support surfaces, respectively, the first and second ridges projecting radially outwardly from the first and second tire support surfaces and being integrally formed with the annular bridge portion, the recessed center surface having a plurality of circumferentially arranged outer openings formed therein;
   an annular spoke attachment portion rigidly coupled with the first and second annular side portions to form an annular hollow area, the annular spoke attachment portion having a plurality of circumferentially arranged inner spoke attachment openings formed therein; and
   an annular seal member removably arranged in the annular recess to seal the outer openings from the hollow area when arranged in the annular recess, the annular seal member being a continuous annular member that extends circumferentially continuously within the annular recess when arranged in the annular recess and having an outer surface with first and second annular end sections arranged adjacent the first and second ridges of the annular bridge portion when the annular seal member is arranged in the annular recess, the seal member includes an inner annular seal portion constructed of a first material and an outer annular support portion having the outer annular surface that is constructed of a second material that is different from and harder than the first material.

8. The bicycle rim according to claim 7, wherein
the second material includes a plastic material and the first material includes a rubber material.

9. The bicycle rim according to claim 7, wherein
the outer support portion of the seal member has an axial length substantially equal to an axial length of the inner seal portion such that the outer support portion substantially overlies the inner seal portion as viewed in a radial direction.

10. A bicycle rim comprising:
first and second annular side portions;
an outer annular bridge portion extending between the first and second annular side portions, the annular bridge portion including first and second radially outwardly facing annular tire support surfaces extending from the first and second annular side portions, respectively, a recessed center surface arranged between the first and second tire support surfaces to form an annular recess, and first and second ridges extending between the recessed center surface and the first and second tire support surfaces, respectively, the first and second ridges projecting radially outwardly from the first and second tire support surfaces and being integrally formed with the annular bridge portion, the recessed center surface having a plurality of circumferentially arranged outer openings formed therein;
an annular spoke attachment portion rigidly coupled with the first and second annular side portions to form an annular hollow area, the annular spoke attachment portion having a plurality of circumferentially arranged inner spoke attachment openings formed therein; and
an annular seal member removably arranged in the annular recess to seal the outer openings from the hollow area when arranged in the annular recess, the annular seal member being a continuous annular member that extends circumferentially continuously within the annular recess when arranged in the annular recess and having an outer surface with first and second annular end sections arranged adjacent the first and second ridges of the annular bridge portion when the annular seal member is arranged in the annular recess,
the recessed center surface including first and second opposed annular side sections that are substantially parallel and a concave connecting section extending between the first and second side sections to form the annular recess.

11. A bicycle rim comprising:
first and second annular side portions;
an outer annular bridge portion extending between the first and second annular side portions, the annular bridge portion including first and second annular tire support surfaces extending from the first and second annular side portions, respectively, a recessed center surface arranged between the first and second tire support surfaces to form an annular recess, and first and second ridges arranged between the recessed center surface and the first and second tire support surfaces, respectively, the recessed center surface having a plurality of circumferentially arranged outer openings formed therein;

an annular spoke attachment portion rigidly coupled with the first and second annular side portions to form an annular hollow area, the annular spoke attachment portion having a plurality of circumferentially arranged inner spoke attachment openings formed therein; and
an annular seal member arranged in the annular recess to seal the outer openings from the hollow area, the annular seal member having an outer surface with first and second annular end sections arranged adjacent the first and second ridges,
the recessed center surface including first and second opposed annular side sections and a concave connecting section extending between the first and second side sections to form the annular recess, the first annular side section including a first outer end and a first inner end located radially inwardly of the first outer end, the second annular side section including a second outer end and a second inner end located radially inwardly of the second outer end, and the first and second outer ends projecting axially toward each other to form first and second projections, respectively,
the first and second inner ends of the first and second annular side sections being concavely curved and the first and second outer ends being offset axially toward each other from the first and second inner ends to form the first and second projections, respectively.

12. An annular seal member for use on a rim with a tubeless tire, the seal member comprising:
an inner annular seal portion configured to be received in a continuous circumferentially extending annular recess of the bicycle rim, the inner annular seal portion being constructed of a first material; and
an outer annular support portion mounted on the inner annular seal portion such that the outer annular support portion substantially overlies the inner annular seal portion as viewed in a radial direction, the outer annular support portion being constructed of a second material that is harder than and different from the first material,
the inner annular seal portion and the outer annular support portion being continuous annular portions that are configured to extend circumferentially continuously within the continuous circumferentially extending annular recess of the bicycle rim when received in the annular recess of the bicycle rim.

13. The annular seal member according to claim 12, wherein
the second material includes a plastic material and the first material includes a rubber material.

14. The annular seal member according to claim 12, wherein
the outer support portion of the seal member has an axial length substantially equal to an axial length of the inner seal portion such that the outer support portion substantially overlies the inner seal portion as viewed in a radial direction.

15. A bicycle rim comprising:
first and second annular side portions;
an annular bridge portion extending between the first and second annular side portions, the annular bridge portion including first and second radially outwardly facing annular tire support surfaces extending from the first and second annular side portions, respectively, and a recessed center surface arranged between the first and second tire support surfaces to form an annular recess, the recessed center surface having a plurality of circumferentially arranged openings formed therein; and an annular seal member arranged in the annular recess to seal the openings without overlying the radially outwardly facing annular tire support surfaces of the annular bridge portion of the rim, the annular seal member including an inner annular seal portion constructed of a first material and an outer annular support portion constructed of a second material that is harder than the first material.

* * * * *